United States Patent Office 3,269,059
Patented August 30, 1966

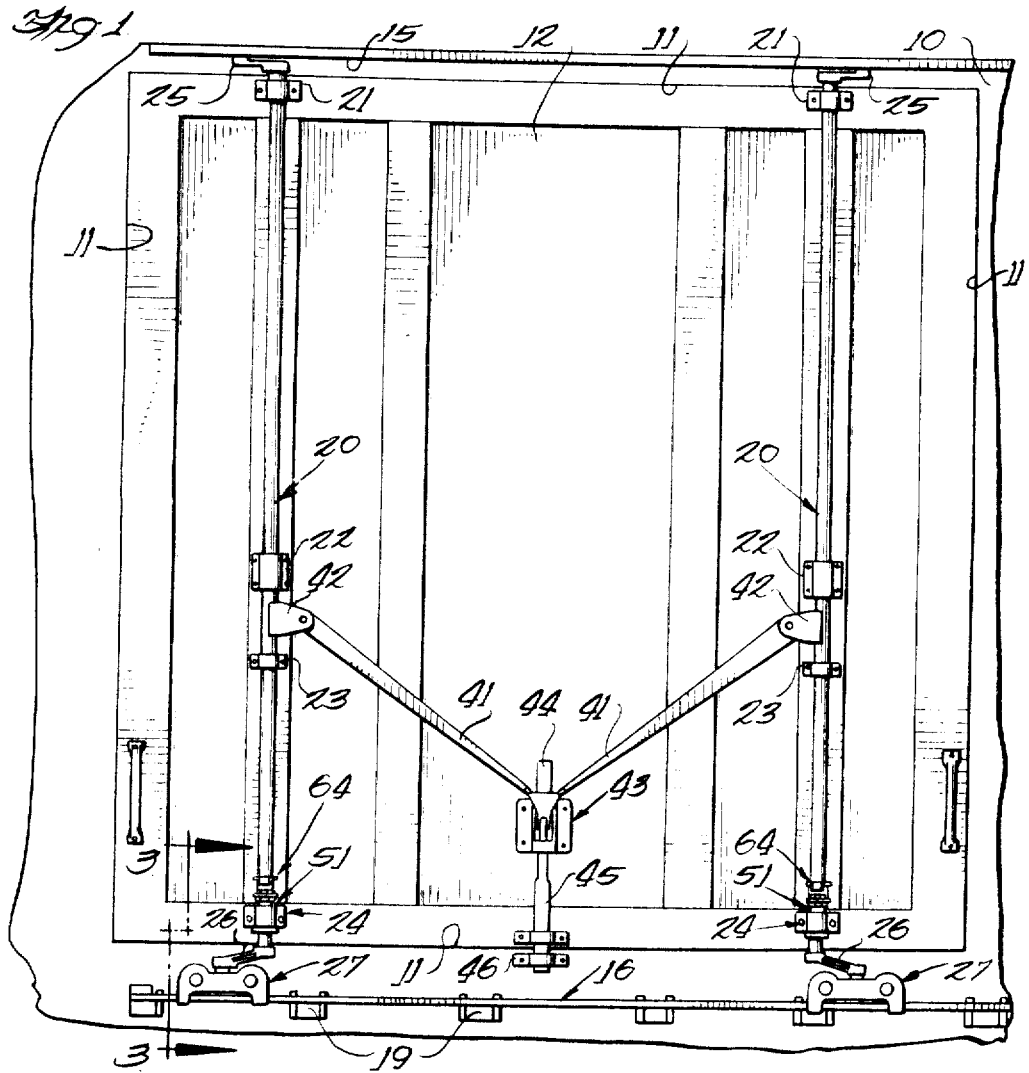
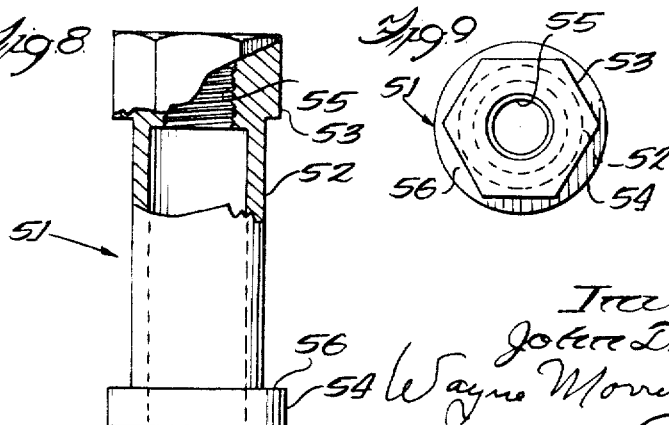

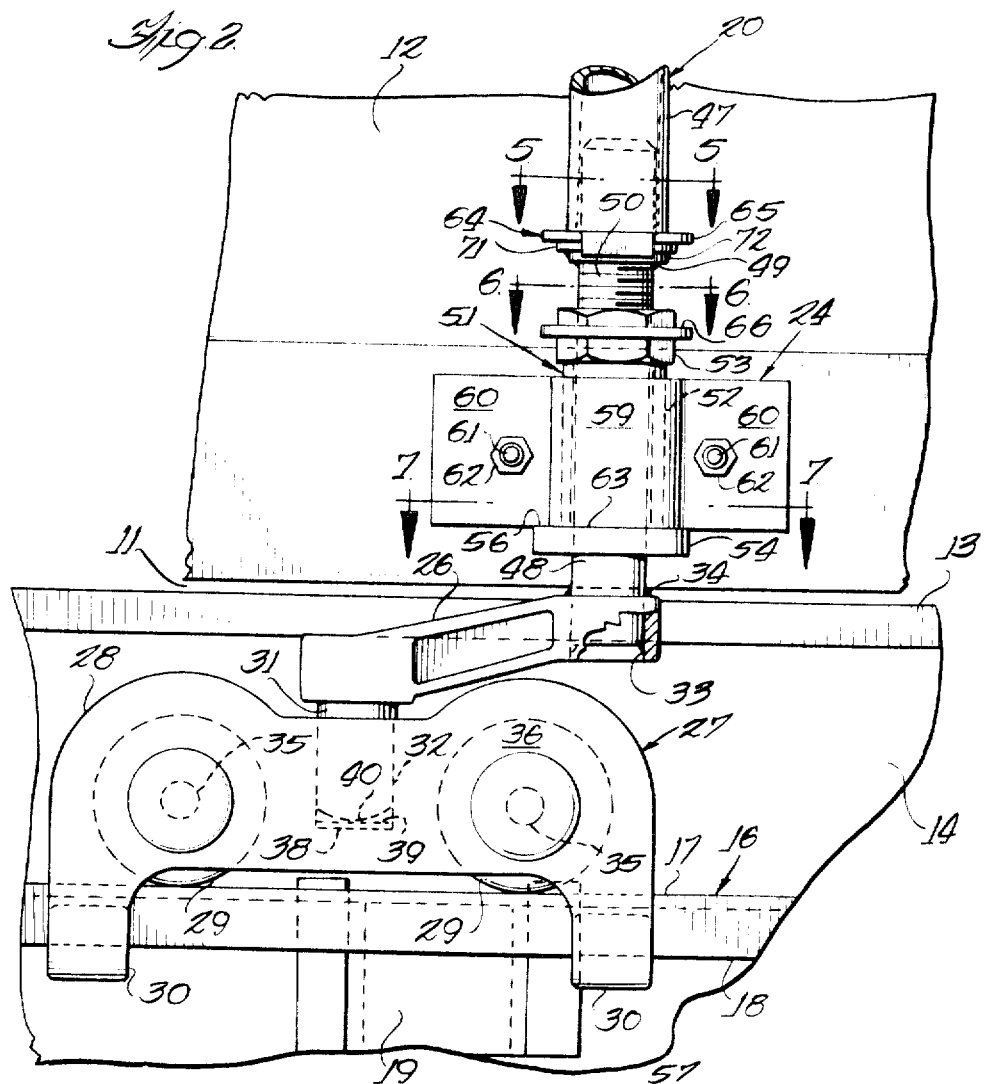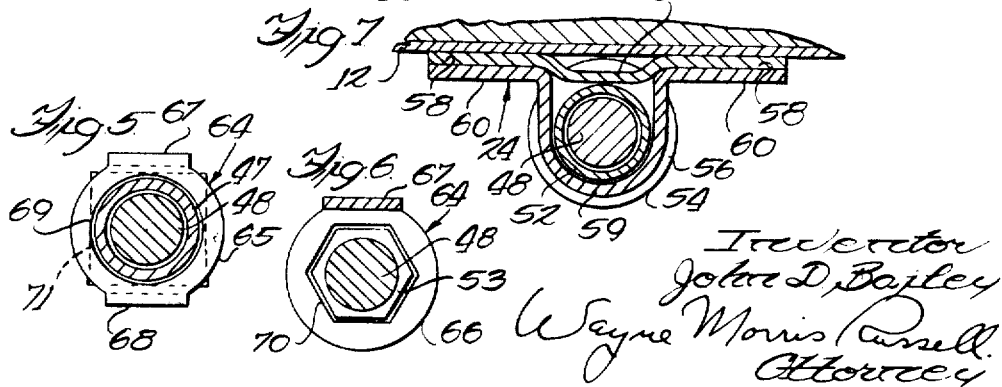

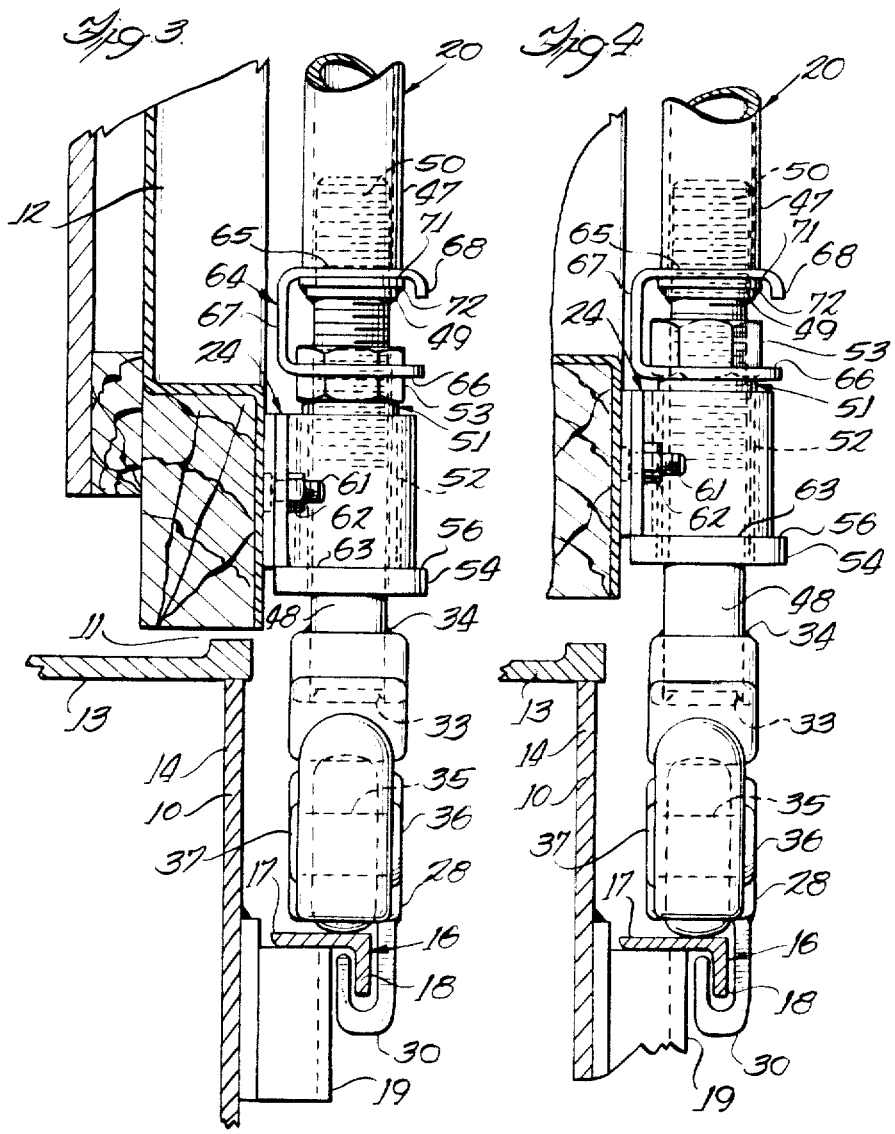

3,269,059
VERTICALLY ADJUSTABLE SUPPORTING MEANS FOR LATERALLY MOVABLE DOORS
John D. Bailey, Chicago, Ill., assignor to Pullman Incorporated, Chicago, Ill., a corporation of Delaware
Filed Aug. 26, 1964, Ser. No. 392,111
9 Claims. (Cl. 49—219)

This invention relates to freight vehicle doors, and more particularly to vertically adjustable supporting means for laterally movable doors, such doors being the type that move into a door opening in the wall structure of a freight vehicle and when fully closed the door is substantially flush with the wall structure.

Laterally movable doors are usually mounted on wall structures of freight vehicles by mechanisms including vertical shafts rotatably mounted on the outer surface of the door and crank arms secured to the upper and lower ends of the shafts, the upper arms being guided and retained in a guide rail secured to the wall structure above the door opening and the lower arms being pivotally connected to and supported on roller carriages carried by a track mounted on the wall structure below the door opening. To prevent binding of the door along its bottom and top edges when it is fully closed, or while it is being moved into or out of the door opening, means have been provided for vertically adjusting the height of the door with respect to the door opening framework. Generally, in the arrangements used the adjusting means contact the lower crank arm spindles which extend into the roller carriages so that any adjustment made in the height of the door involves a similar adjustment in the door mounting mechanism.

It is an object of this invention to provide mechanism for mounting a laterally movable door which shall embody vertically adjustable door supporting means having parts so arranged as to make the door adjustable vertically with reference to the mechanism.

A further object is to provide mechanism for mounting a laterally movable door which shall embody vertical shafts having vertically adjustable door supporting means the parts of which shall be arranged to make the door adjustable vertically with reference to the shafts.

A further object is to provide mechanism for mounting a laterally movable door which shall embody vertical shafts having sleeves for supporting the door and the sleeves shall be adjustable vertically relative to the shafts and shall have locking means to prevent relative rotation between the shafts and the sleeves.

The foregoing and other objects of the invention are attained by the mechanism and arrangement illustrated in the accompanying drawings wherein:

FIG. 1 is a fragmentary elevational view of a wall structure of a freight vehicle showing a laterally movable door in closed position covering a door opening provided in the wall structure and the door mounting mechanism incorporating the vertically adjustable door supporting means of this invention;

FIG. 2 is a fragmentary elevational view of a portion of FIG. 1 showing a portion of the door mounting mechanism and the vertically adjustable door supporting means to a larger scale;

FIG. 3 is a vertical sectional view taken on line 3—3 of FIG. 1 showing the door and the door supporting means in normal position vertically;

FIG. 4 is a vertical sectional view the same as in FIG. 3 except showing the door and the door supporting means in an upwardly adjusted position;

FIG. 5 is a horizontal sectional view taken on line 5—5 of FIG. 2;

FIG. 6 is a horizontal sectional view taken on line 6—6 of FIG. 2;

FIG. 7 is a horizontal sectional view taken on line 7—7 of FIG. 2;

FIG. 8 is an elevational view of the sleeve of the door supporting means with a portion broken away showing the sleeve in section; and FIG. 9 is a plan view of the sleeve shown in FIG. 8.

Referring to the drawings the numeral 10 indicates a portion of a freight vehicle wall structure having a customary rectangular door opening 11 which is adapted to be closed by door 12. Door 12 is of the type commonly used in freight vehicles and referred to as a laterally movable door. It is well known that such a door moves into the door opening and when the door is in closed position its inner and outer surfaces are flush with the inner and outer surfaces of the wall structure. Door 12 and wall structure 10 may be of any desired construction. The construction of door 12 and the horizontal 13 and vertical 14 members partially forming the lower framework of door opening 11, as shown in FIGS. 3 and 4, are for illustrative purposes only.

As shown in FIG. 1 there is a guide rail 15 secured to the wall structure 10 above the door opening 11. The guide rail 15 is formed to provide a groove having a downwardly facing opening extending longitudinally the width of the door opening 11 and beyond the right-hand side thereof for a distance approximately equal to the width of opening. Below the door opening 11 is an angle section track 16 which is in vertical alignment and extends longitudinally in length the same as the guide rail 15. Outward depending flange 18 of the track 16 is disposed in outwardly spaced parallel relation to the wall structure 10 and horizontal flange 17 is mounted on and secured to a plurality of vertically disposed longitudinally spaced hat-section brackets 19 which are secured to the vertical member 14 of the wall structure 10.

FIG. 1 also shows the general arrangement of a mechanism for mounting the door 12 to the wall structure 10 and for operating the door 12 to move it laterally into and out of the door opening 11 and when in its outward lateral position to move the door longitudinally of the wall structure to uncover the door opening. As shown vertical circular shafts 20 are rotatably mounted on the outer surface of door 12 adjacent the opposite vertical side edges thereof by means of upper 21, intermediate 22 and 23 and lower 24 brackets secured to the door. The shafts 20 extend above and below the top and bottom edges of door 12 and have upper 25 and lower 26 crank arms which are secured at one of their ends to the respective upper and lower ends of the shafts. The opposite free ends of crank arms 25 have upwardly extending roller type followers which engage the groove of guide rail 15 to guide and retain the door 12 during lateral movement into and out of the door opening 11 and longitudinal movement along the wall structure 10. The ends opposite the shaft ends of crank arms 26 are pivotally connected and supported on roller carriages 27 which in turn are mounted on track 16.

Each roller carriage 27, as best shown in FIGS. 2, 3 and 4, comprises a housing 28 having inner 37 and outer 36 laterally spaced vertical walls and a pair of longitudinally spaced vertical rollers 29 adapted for mounting on track 16. The rollers 29 are disposed within the housing 28 between the vertical walls 36 and 37 and are pivotally mounted thereto by means of horizontal pins 35. End portions of the vertical wall 36 extend downwardly, inwardly and upwardly to form hook portions 30 which slidably engage the depending flange 18 of track 16 to guide and retain the rollers 29 on the track 16 during longitudinal movement of the door 12. Each lower crank arm 26 has a downwardly extending spindle 31 which pivotally engages bore 32 in the roller carriage housing 28. The bore 32 has a bottom wall 38 and a washer 39 upon which the bottom convex surface 40 of the spindle 31 is mounted. The lower end portions of the shafts 20 are integrated with the crank arms 26 by welding as shown at 33 and 34 in FIG. 2.

Rotation of the shafts 20 to move the door 12 laterally into and out of the door opening 11 is actuated by swinging movement of levers 41 which are pivotally mounted to clevises 42 secured to the shafts. When the door is in closed position in the door opening the levers 41 are locked at their outer ends by a device generally designated by numeral 43. This device includes an operating handle 44 which is pivotally mounted at its lower end and swings outwardly and downwardly to release the levers 41 and at the same time to engage slide bolt 45 to move it upwardly in retracted position out of keeper 46 which is secured to the wall structure 10. Since the device 43 forms no part of the present invention it is believed that the brief description set forth above will be sufficient.

Referring now to FIG. 2 which best shows the vertically adjustable door supporting means of the present invention incorporated with one of the vertical shafts 20, it being understood that the combination and arrangement of parts and details of construction as shown in FIG. 2 and described below applies to both shafts 20 of the door mounting and operating mechanism as shown in FIG. 1. It will be noted that the shaft 20 is made up of two elements, the upper major element of which is a circular tube 47 and the lower element a circular bar 48. A portion of the circular bar 48 at its upper end extends into the circular tube 47 at its lower end and the two elements are integrated by welding as indicated at junction point 49. A portion of the bar 48 extending from the top end of the bar to a point located below the junction point 49 is externally threaded 50 as best shown in FIGS. 3 and 4. The bar 48 is surrounded by a sleeve 51 which, as shown in detail in FIGS. 8 and 9, comprises a circular body 52, an upper hexagonal shape head 53 and a lower outwardly extending flange 54. The head 53 is internally threaded 55, the threads mating with the external threads of portion 50 of the circular bar 48. The flange 54 is circular in plan and forms an upwardly facing supporting surface 56 extending around the circular body 52.

As best shown in FIG. 7 each lower bracket 24 consists of an inner and an outer part each being generally hat-shape in horizontal section and each having a central portion, 57 and 59 respectively, offset outwardly from the outer surface of door 12 and oppositely directed flanges, 58 and 60, respectively extending outwardly on each side of the central portions. The flanges 58 of the inner part are applied against the outer surface of door 12 and the flanges 60 of the outer part against the flanges 58 and both pairs of flanges are secured to the door by means of threaded stud bolts 61 and threaded fasteners 62. When the two parts of the bracket 24 are secured to the door 12 they form a vertically disposed opening for mounting and guiding the body 52 of the sleeve 51 during rotation of the shaft 20. The lower edges of the central portions 57 and 59 form a downwardly facing mounting surface 63 which contacts the upwardly facing supporting surface 56 of the flange 54 of the sleeve 51.

From the foregoing it can be seen that the sleeve 51 is adjustable vertically by simple rotation of the sleeve with respect to the shaft 20, the mating threaded portions of the sleeve head 55 and the shaft bar 50 moving the sleeve upward or downward as desired in accordance with the direction in which the sleeve is being rotated. Vertical adjustment of the sleeve causes vertical adjustment of the bracket 24 since the downwardly facing mounting surface 63 of the bracket is supported on the upwardly facing supporting surface 56 of the sleeve flange 54. This facing supporting surface 56 of the sleeve flange 54 in turn causes vertical adjustment of the door 12 through the brackets 24 which are secured to the door. It should be noted that in this adjustment operation the door moves vertically with reference to the shafts, there being no vertical movement in the shafts or other parts of the door mounting mechanism. In this connection FIGS. 3 and 4 show the positions of the door 12, bracket 24 and sleeve 51 with respect to the shaft 20, the door being in normal height position in FIG. 3 and in an upwardly adjusted height position in FIG. 4.

After the sleeve 51 has been adjusted to position the door 12 in the desired height location, locking means are employed to prevent relative rotation between the sleeve and the shaft 20. One of the elements of the locking means is a latch piece 64 having vertically spaced upper 65 and lower 66 horizontal flanges connected on one side by a vertical web 67 as best shown in FIGS. 2, 3 and 4. Disposed upwardly from the shaft junction point 49 which defines the upper end of the usable threaded portion 50 of the shaft bar 48, is a horizontal plate 71 which is secured to the shaft tube 47 by welding as shown at 72. As shown in FIG. 5 the edges of the plate 71 are rectangular in plan and thus the plate forms a ledge projecting around the shaft tube 47. The upper flange 65 of the latch 64 has a centrally disposed circular aperture 69 which slidably engages the tube 47. The latch 64 acts by gravity and is held in locking position by the upper flange 65 which is supported on the ledge 71. At the outer side of the upper flange 65 opposite the web 67 is a depending lip 68. In the locking position of the latch the web 67 and the lip 68 are disposed in adjacent parallel relation to respectively opposite edges of the ledge 71 thereby providing interlocking portions which prevent relative rotation between the latch 64 and the shaft 20. The lower flange 66 has a centrally disposed hexagonal shape aperture 70 which in the locking position of the latch slidably engages the hexagonally related vertical surfaces of the sleeve head 53 thereby providing interlocking portions which prevent relative rotation between the latch 64 and the sleeve 51. Thus the latch 64 in its interlocking position with the shaft 20 and the sleeve 51 prevents relative rotation between the shaft and the sleeve.

It should be noted that while the shape of the sleeve head 53 is disclosed as being hexagonal, other shapes could be employed. For example the head could be rectangular or circular in plan wherein a circular head could have flat vertical surfaces formed by cutting away one or more segments or notches in the periphery of the head. In these cases the shape of the aperture 70 in the latch flange 66 would include flat edge portions matching the flat vertical surfaces of the particular sleeve head used so as to provide interlocking portions to prevent relative rotation between shaft 20 and the sleeve 51.

From the foregoing it can be seen that the vertically adjustable door supporting means of the present invention are embodied in the vertical shafts 20 of the door mounting mechanism. The supporting means are operable to vertically adjust the height of the door with reference to the shafts and other parts of the door mounting mechanism. In other words, the operation to adjust the door vertically with reference to the door opening does not involve any vertical movement of the door mounting mechanism. Since the supporting means are disposed adjacent to the bottom edge of the door, they are readily accessible for manual operation from the ground level outside the vehicle. Vertical adjustment of the door is easily accomplished first by lifting the latch piece 64 above the top of the sleeve head 53 to release the interlocking portions of the locking means and then gripping the sleeve head with a wrench for rotation in either direction to move the door respectively upwardly or downwardly as desired. After the door has been adjusted to the desired height the latch piece is lowered to its former locking position engaging the shaft ledge 71 and the sleeve head 53 thereby forming interlocking portions to prevent relative rotation between the shaft and the sleeve.

What is claimed is:

1. Mechanism for mounting a laterally movable door on a wall structure including a vertical shaft rotatably mounted on the door, said shaft extending through and being guided by a bracket secured to said door, said bracket having a downwardly facing mounting surface, and said shaft having vertically adjustable means in supporting contact with said mounting surface of said bracket whereby said door is vertically adjustable with reference to said shaft, wherein said vertically adjustable means comprises a sleeve surrounding said shaft, said sleeve having an internally threaded upper end head portion mating with an externally threaded shaft portion disposed in vertically spaced relation to said mounting surface of said bracket, said sleeve extending downwardly from said head portion through said bracket and having a lower end flange in supporting contact with said mounting surface, and locking means for preventing relative rotation between said sleeve and said shaft, said locking means having interlocking portions releasable from said shaft and said head portion for manual adjustment of said sleeve.

2. The combination claimed in claim 1 wherein said locking means comprises a horizontal ledge projecting around said shaft, said ledge being upwardly spaced from said externally threaded portion, a latch piece having vertically spaced upper and lower horizontal flanges, said upper flange being slidably mounted on said shaft and supported on and forming interlocking portions with said ledge, said lower flange slidably engaging and forming interlocking portions with said head of said sleeve, and said latch piece being liftable to release said interlocking portions for vertical adjustment of said sleeve.

3. The combination claimed in claim 2 wherein the edges of said ledge are rectangular in plan, the periphery of said head of said sleeve comprises flat vertical surfaces angularly related in plan, the upper and lower flanges of said latch piece are connected together at one side by a vertical web, said web being disposed in adjacent parallel relation with one edge of said ledge, the outer side of said upper flange opposite said web having a depending lip in adjacent parallel relation with the edge opposite to said first mentioned edge, and said lower flange having an aperture shaped to include flat edge portions matching and slidably engaging the angularly related flat surfaces of said sleeve head.

4. In a freight vehicle wall having a door opening, a laterally movable door for closing said opening, mechanism for mounting said door on said wall including a track secured to said wall below said door opening, a pair of vertical shafts rotatably mounted on the outer surface of said door adjacent its vertical edges, said shafts extending below said door and having horizontal arms secured thereto, said arms being pivotally connected to and supported on roller carriages mounted on said track, the combination wherein said shafts each have an externally threaded portion disposed upwardly from the lower edge of said door, sleeves surrounding said shafts having upper head portions internally threaded and mating with said threaded portions of said shafts, said sleeves having lower end flanges in supporting contact with brackets disposed around and guiding said sleeves, and said brackets being secured to said door whereby said door is vertically adjustable with reference to said mechanism.

5. The combination claimed in claim 4 wherein means are provided for preventing relative rotation between said sleeves and said shafts, said means comprising latch pieces slidably mounted on said shafts, said latch pieces each having an upper portion engaging locking means on the respective shafts and a lower portion engaging locking means on the respective upper head portions of said sleeves, said latch pieces being movable vertically to release said locking means for rotation of said sleeves with respect to said shafts to adjust said door vertically.

6. Vertically adjustable supporting means for a laterally movable door comprising a bracket having a central portion defining a vertically disposed opening and flanges extending oppositely outwardly on each side of said central portion, said flanges being secured to the face of the door, a vertically disposed sleeve extending through and being rotatably guided in said opening of said bracket, said sleeve having an outwardly extending flange at its lower end and a head at its upper end, said flange having its top surface in supporting contact with the lower edge of said bracket, said head being internally threaded and disposed above said bracket, a vertically disposed shaft circular shape in section extending through and being guided for rotation and vertical movement in said sleeve, said shaft having an externally threaded portion mating with said internally threaded head of said sleeve, a horizontal ledge projecting around said shaft disposed upwardly from said externally threaded portion, said ledge supporting locking means for preventing relative rotation between said sleeve and said shaft, and said locking means having interlocking portions releasable from said shaft and said sleeve head for manual adjustment of said sleeve.

7. The combination claimed in claim 6 wherein the edges of said ledge of said shaft are rectangular in plan, said locking means comprises a latch piece having vertically spaced upper and lower horizontal flanges, a vertical web connecting said flanges at one side thereof, said web being in adjacent parallel relation with one edge of said ledge, said upper flange having an aperture slidably engaging said shaft and being vertically movable thereon, a depending lip extending at the side of said upper flange opposite said web, said upper flange being disposed on top of said ledge with said web and said lip slidably engaging respectively opposite edges of said ledge, said lower flange having an aperture slidably engaging said head of said sleeve, and said latch piece being movable upwardly to clear said sleeve head for rotation of said sleeve with respect to said shaft to adjust said door vertically.

8. Mechanism for mounting a laterally movable door on a wall structure including a generally vertical shaft rotatably mounted on the door, said shaft extending through and being guided by a bracket secured to said door, said bracket having a downwardly facing mounting surface, and said shaft having vertically adjustable means in supporting engagement with said mounting surface of said bracket whereby said door is vertically adjustable with reference to said shaft, said vertically adjustable means comprising a sleeve surrounding said shaft and said shaft having a mating portion, said sleeve having a head portion adjustably mating with the shaft portion, said shaft portion being disposed above said mounting surface of said bracket, said sleeve extending downwardly from said sleeve head portion through said bracket and having a lower end flange in supporting relation with said mounting surface.

9. Mechanism for mounting a laterally movable door on a wall structure including a generally vertical shaft rotatably mounted on the door, said shaft extending through and being guided by a bracket secured to said door, said bracket having a mounting surface, and said shaft having vertically adjustable means in supporting engagement with said mounting surface of said bracket whereby said door is vertically adjustable with reference to said shaft, said vertically adjustable means comprising a sleeve surrounding said shaft and said shaft having a mating portion, a head portion adjustably mating with the shaft portion, said shaft portion being disposed in vertically spaced relation to said mounting surface of said bracket, said sleeve extending downwardly from said sleeve head portion through said bracket and having a lower end flange in supporting relation with said mounting surface, and locking means for preventing relative rotation between said sleeve and said shaft, said locking means being releasable from said shaft and said sleeve for adjustment of said sleeve.

References Cited by the Examiner
UNITED STATES PATENTS

| | | | |
|---|---|---|---|
| 597,383 | 1/1898 | Blankenship | 16—132 |
| 684,726 | 10/1901 | Sawyer. | |
| 3,040,392 | 6/1962 | Beauchamp | 20—23 |

References Cited by the Applicant
UNITED STATES PATENTS

| | | |
|---|---|---|
| 2,559,447 | 7/1951 | Madland. |
| 2,658,244 | 11/1953 | Madland. |
| 2,816,317 | 12/1957 | Madland. |
| 3,059,289 | 10/1962 | Roland. |

HARRISON R. MOSELEY, *Primary Examiner.*

A. I. BREIER, *Assistant Examiner.*